US007853055B2

(12) United States Patent
Machida

(10) Patent No.: US 7,853,055 B2
(45) Date of Patent: Dec. 14, 2010

(54) FINGERPRINT VERIFICATION DEVICE

(75) Inventor: Akihiro Machida, Sunnyvale, CA (US)

(73) Assignee: Avago Technologies ECBU IP (Singapore) Pte. Ltd., Singapore (SG)

(*) Notice: Subject to any disclaimer, the term of this patent is extended or adjusted under 35 U.S.C. 154(b) by 1153 days.

(21) Appl. No.: 11/506,435

(22) Filed: Aug. 18, 2006

(65) Prior Publication Data
US 2006/0280346 A1 Dec. 14, 2006

Related U.S. Application Data

(62) Division of application No. 10/338,268, filed on Jan. 7, 2003, now Pat. No. 7,116,805.

(51) Int. Cl.
*G06K 9/00* (2006.01)
(52) U.S. Cl. .................................................. 382/124
(58) Field of Classification Search ............... 382/124, 382/126, 127, 313, 314, 315; 340/5.52, 5.53, 340/5.82, 5.83, 356; 358/496, 497, 486; 250/234
See application file for complete search history.

(56) References Cited

U.S. PATENT DOCUMENTS

| 6,241,288 | B1 | 6/2001 | Bergenek et al. | |
|---|---|---|---|---|
| 7,113,622 | B2 * | 9/2006 | Hamid | 382/124 |
| 7,260,246 | B2 * | 8/2007 | Fujii | 382/124 |
| 2002/0061125 | A1 * | 5/2002 | Fujii | 382/125 |
| 2003/0002717 | A1 * | 1/2003 | Hamid | 382/124 |
| 2004/0042642 | A1 | 3/2004 | Bolle et al. | |

* cited by examiner

*Primary Examiner*—Brian Q Le

(57) ABSTRACT

A fingerprint verification device includes a fingerprint sensor including an imaging surface. The fingerprint sensor is configured to capture images of a user's finger when the finger is swiped against the imaging surface. A memory stores fingerprint data. A controller compares minutiae in the captured images with the stored fingerprint data to verify the user's identity. The controller is configured to determine whether the finger is a real human finger based on the spacing of minutiae in the captured images.

10 Claims, 6 Drawing Sheets

FINGERPRINT VERIFICATION DEVICE

This is a Divisional of application Ser. No. 10/338,268, filed on Jan. 7, 2003 now U.S. Pat. No. 7,116,805, the entire disclosure of which is incorporated herein by reference.

THE FIELD OF THE INVENTION

The present invention generally relates to biometric devices, and more particularly to a fingerprint verification device.

BACKGROUND OF THE INVENTION

In recent years, fingerprints have played an important role in a field known as biometrics. Biometrics refers to the field of technology devoted to identification of individuals using biological traits. Fingerprints may be acquired in the form of digital images that are amenable to processing by computer software. There are a number of existing techniques for capturing a fingerprint in a digital format, including capacitive sensors, thermal sensors, and optical sensors.

Capacitive sensors have problems with electrostatic discharge (ESD), and with sensing dry fingers. Thermal sensors use a heater and correspondingly have an undesirable heat up lag time. Optical sensors do not use a heater, typically have less of a problem with ESD than capacitive sensors, and are better able to sense a dry finger. But current optical sensors have a problem with distinguishing between a real human finger and a "fake" finger, such as a photocopy of a real human finger.

Fingerprint sensors can be classified as either area sensors or swipe sensors. Swipe sensors are also referred to as linear sensors, since they typically use a linear array, as opposed to an area array, of sensing elements. With an optical area sensor, images of a finger are captured while the finger is held stationary on the area array of sensing elements. With an optical swipe sensor, a user slides or swipes his finger on the sensor, which captures multiple images during the swipe. The sequence of captured images is then combined or "stitched" together to form one continuous fingerprint image.

Area sensors typically take up more space than swipe sensors. In some applications, such as for some portable electronic devices (e.g., cellular telephones, personal digital assistants (PDA's), laptop computers, etc.), it is undesirable to have a large area dedicated to placing a finger on for the purpose of finger recognition.

SUMMARY OF THE INVENTION

One form of the present invention provides a fingerprint verification device. The device includes a fingerprint sensor including an imaging surface. The fingerprint sensor is configured to capture images of a user's finger when the finger is swiped against the imaging surface. A memory stores fingerprint data. A controller compares minutiae in the captured images with the stored fingerprint data to verify the user's identity. The controller is configured to determine whether the finger is a real human finger based on the spacing of minutiae in the captured images.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
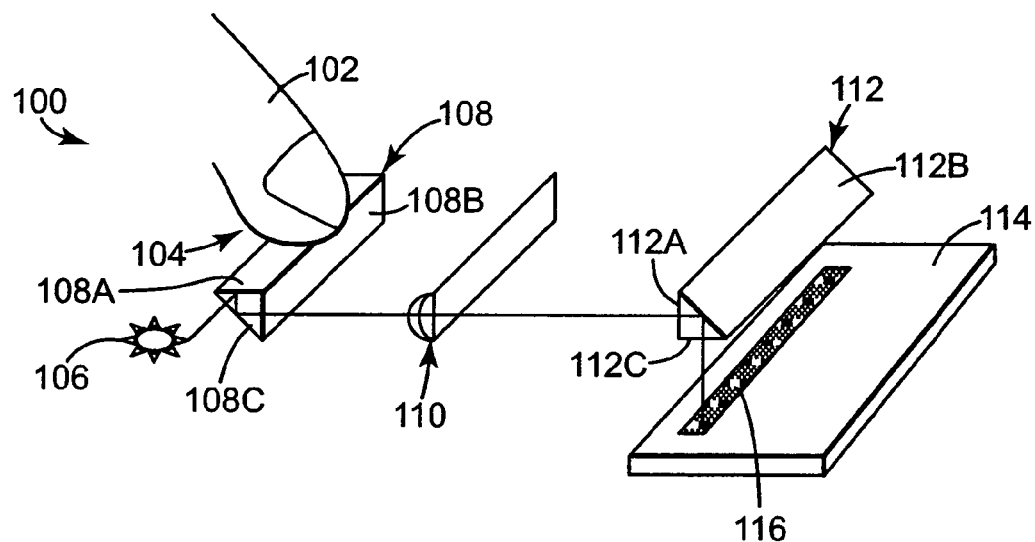
FIG. 1 is a simplified schematic diagram illustrating an optical fingerprint swipe sensor according to one embodiment of the present invention.

FIG. 1 is a simplified schematic diagram illustrating an optical fingerprint swipe sensor 100 according to one embodiment of the present invention. Fingerprint swipe sensor 100 includes light source 106, finger prism 108, optics 110, sensor prism 112, and image sensing and processing device 114. Image sensing and processing device 114 includes image sensor 116. In one embodiment, sensor 100 is implemented in the form of a module that may be used in portable electronic host devices, such as laptop computers, personal digital assistants (PDA's), cellular telephones, as well as other types of devices. Fingerprint sensor 100 may also be used in many other types of host devices, whether portable or not, where finger recognition functionality is desired. In one form of the invention, image sensing and processing device 114 is implemented as an integrated circuit (IC) chip. In one embodiment, image sensor 116 is a complimentary metal oxide semiconductor (CMOS) image sensor. In one form of the invention, in addition to the optics shown in FIG. 1, sensor 100 also includes additional optical parts, such as more lenses and an aperture.

Finger prism 108 includes first (swipe) surface 108A, second surface 108B, and third surface 108C. A user swipes fingertip 104 of finger 102 across the swipe surface 108A of prism 108. In one embodiment, the swipe surface 108A is about 9 mm long, 1 mm wide at both ends, and 2 mm wide near the center. Light from light source 106 illuminates fingertip 104. Although a single light source 106 is shown in FIG. 1, in other embodiments, multiple light sources 106 are used. In one form of the invention, light source 106 includes one or more light emitting diodes (LED's). The light reflected from fingertip 104 is reflected by surface 108C, passes through surface 108B, and is directed by optics 110 onto sensor prism 112.

Sensor prism 112 includes first surface 112A, second surface 112B, and third surface 112C. The light directed onto sensor prism 112 from optics 110 passes through surface 112A, is reflected by surface 112B, passes through surface 112C, and strikes image sensor 116. Device 114 processes images captured by image sensor 116 as described in further detail below.

When a user slides or swipes his finger 102 on the finger prism 108, image sensor 116 captures multiple images of the finger 102 during the swipe. In one embodiment, this sequence of captured images is combined by device 114 to form one continuous fingerprint image. The process for combining images is referred to as "stitching." In one embodiment, stitching is performed by device 114 based on navigation information that indicates how much the finger 102 moved between captured images. In one embodiment, the navigation information is extracted by device 114 from the captured images themselves, as described in further detail below. In addition to using the navigation information for stitching in finger recognition applications, the navigation information may also be used to control a cursor on a display screen of a host device, as a rocker-switch for selecting menu items on a displayed menu, for free-hand writing, as well as other applications.

Figure 2:
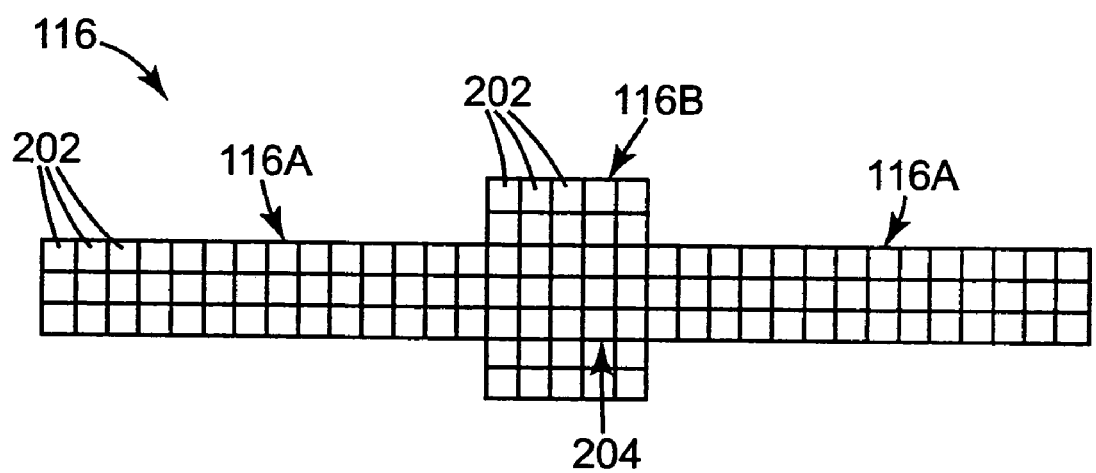
FIG. 2 is a diagram illustrating an image sensor for the optical fingerprint swipe sensor shown in FIG. 1 according to one embodiment of the present invention.

FIG. 2 is a diagram illustrating the image sensor 116 according to one embodiment of the present invention. Image sensor 116 includes a stitching sensor portion 116A and a navigation sensor portion 116B. Sensor portions 116A and 116B each include a plurality of pixel circuits (pixels) 202 organized into a plurality of rows and a plurality of columns. The pixels 202 in stitching sensor portion 116A capture image information for generating digital images of a finger that are stitched together to form a larger stitched image. The pixels 202 in navigation sensor portion 116B capture image information that is processed to determine the amount and direction of movement of finger 102. The pixels 202 that are contained in the overlapping region 204 of the two sensor portions 116A and 116B capture image information for both stitching and finger navigation functions.

The number of pixels 202 in image sensor 116 is defined by the desired resolution, which is 400 dots per inch (dpi) in one form of the invention. In order to capture a fingerprint image with enough features for recognition, a certain resolution and area should be captured. With a 12×16 millimeter (mm) area at 400 dpi resolution, approximately 64 "minutiae" can be extracted. As will be understood by persons of ordinary skill in the art, "minutiae" are finger features that are used for recognition. Smaller and less expensive sensors that scan smaller areas (e.g., 9×12 mm) at the same (400 dpi) or lower resolution (e.g., 300 dpi) may also be used. In one embodiment, stitching sensor portion 116A includes 16 rows and 144 columns of pixels 202, and navigation sensor portion 116B includes 32 rows and 32 columns of pixels 202. In one embodiment, image sensor 116 is implemented with three separate sensors positioned adjacent to one another.

Figure 3:
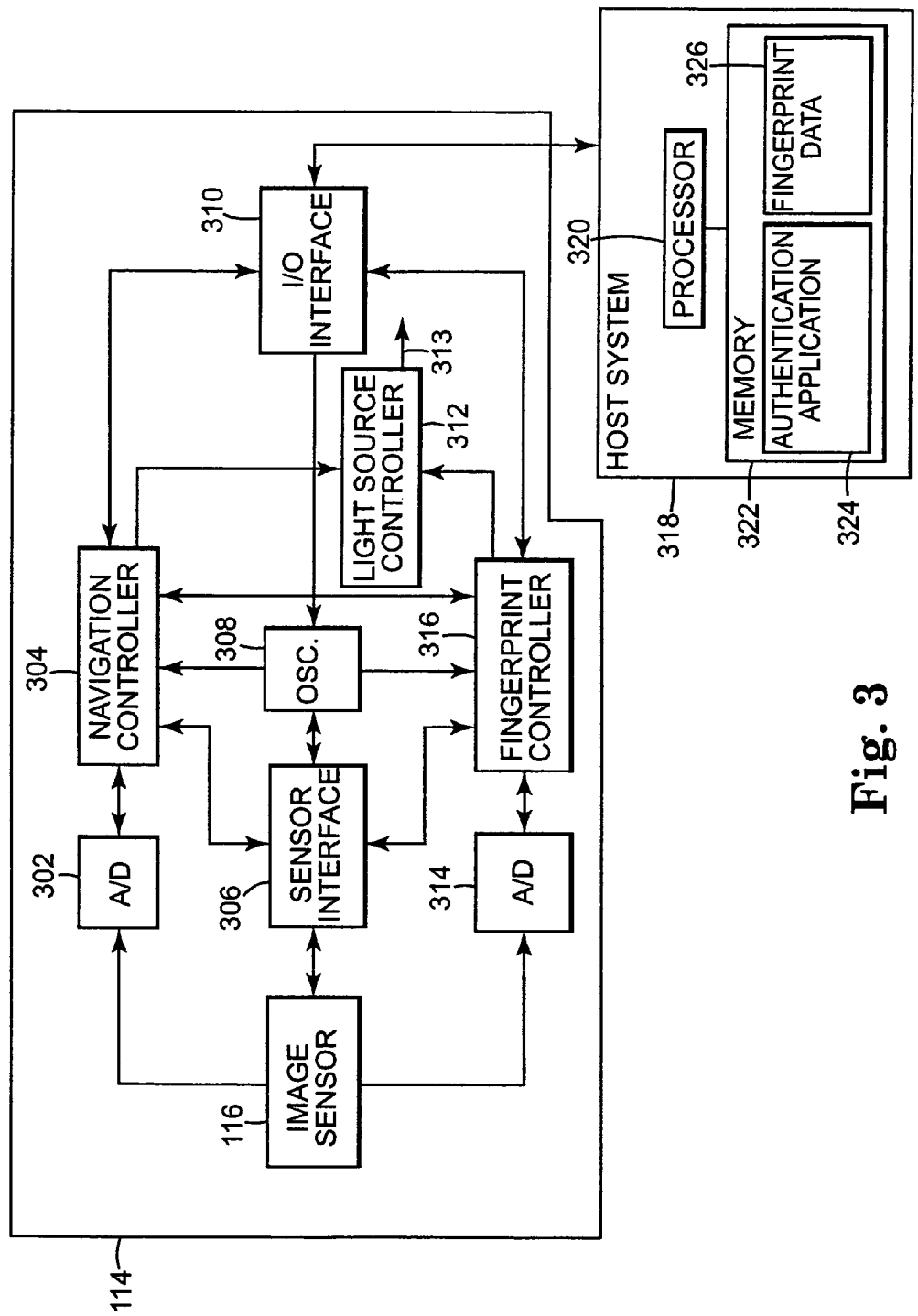
FIG. 3 is a block diagram illustrating major components of an image sensing and processing device for the optical fingerprint swipe sensor shown in FIG. 1 according to one embodiment of the present invention.

FIG. 3 is a block diagram illustrating major components of the image sensing and processing device 114 for the fingerprint sensor 100 shown in FIG. 1 according to one embodiment of the present invention. Device 114 includes image sensor 116, analog-to-digital (A/D) converter 302, navigation controller 304, sensor interface 306, oscillator (Osc) 308, input/output (I/O) interface 310, light source controller 312, analog-to-digital converter 314, and fingerprint controller 316. A host system 318, which is communicatively coupled to device 114, is also shown in FIG. 3.

Oscillator 308 provides a clock signal to navigation controller 304, fingerprint controller 316, and to image sensor 116 (through sensor interface 306). Oscillator 308 is programmable by host system 318 via input/output interface 310. Navigation controller 304 and fingerprint controller 316 control image sensor 116 using control signals sent to sensor interface 306.

In operation, according to one embodiment, light source 106 (shown in FIG. 1) emits light that is directed onto finger 102. Light source 106 is controlled by signals 313 from light source controller 312, which is controlled by navigation controller 304 and fingerprint controller 316. Reflected light from finger 102 is directed by optics 110 and prism 112 (both shown in FIG. 1) onto image sensor 116. In one form of the invention, the charge from each pixel circuit 202 is accumulated for a predetermined exposure period, thereby creating a voltage that is related to the intensity of light incident on the pixel circuit 202. The voltage for each pixel circuit 202 in navigation sensor portion 116B is output to analog-to-digital converter 302. The voltage for each pixel circuit 202 in stitching sensor portion 116A is output to analog-to-digital converter 314. Analog-to-digital converters 302 and 314 convert the received voltages to digital values of a suitable resolution (e.g., one to eight bits) indicative of the level of voltage. The digital values represent a digital image or digital representation of a portion of finger 102. Navigation controller 304 and fingerprint controller 316 process the digital images as described below.

The digital image information output from analog-to-digital converter 302 to navigation controller 304 include several features (e.g., whorls of skin in the finger). Images of such spatial features produce translated patterns of pixel information as finger 102 is moved relative to surface 108A of prism 108. The number of pixel circuits 202 in navigation sensor portion 116B and the frame rate at which their contents are captured and digitized cooperate to influence how fast finger 102 can be moved and still be tracked. Navigation controller 304 tracks movement by comparing a newly captured sample frame with a previously captured reference frame to ascertain the direction and amount of movement.

The $\Delta X$ and $\Delta Y$ movement information is output from navigation controller 304 through input/output interface 310 to host system 318 for finger navigation applications. For finger recognition applications, the $\Delta X$ and $\Delta Y$ information is provided to fingerprint controller 316 to facilitate the stitching of images together.

Fingerprint controller 316 receives digital image information from A/D converter 314. In one embodiment, fingerprint controller 316 stitches the captured images together using the $\Delta X$ and $\Delta Y$ information provided by navigation controller 304, thereby forming larger combined or stitched images. In one form of the invention, fingerprint controller 316 also performs other image processing operations on the images to make them more suitable for fingerprint recognition. For example, in one embodiment, fingerprint controller 316 converts captured gray scale images into black and white images, which essentially enhances the contrast of the images. As will be understood by persons of ordinary skill in the art, additional image processing operations may also be performed. In one form of the invention, fingerprint controller 316 outputs the stitched and processed images through input/output interface 310 to host system 318, which performs fingerprint recognition functions. In another embodiment, fingerprint controller 316 performs the fingerprint recognition functions.

Host system 318 includes processor 320 and memory 322. Authentication application 324 and fingerprint data 326 are stored in memory 322. Authentication application 324 is executed by processor 320, and analyzes fingerprint images output by fingerprint controller 316 to authenticate or verify the user of host system 318. In one embodiment, host system 318 is a portable electronic device, such as a cellular telephone, PDA, or laptop computer.

In one embodiment, fingerprint data 326 includes a unique set of data for each authorized user of host system 318. The fingerprint data 326 is obtained during an enrollment phase, and is stored in memory 326. In one form of the invention, during the enrollment phase, an authorized user is requested by host system 318 to swipe his finger in a downward direction on swipe surface 108A of swipe sensor 100, and then to swipe his finger upward on swipe surface 108A. Fingerprint controller 316 generates corresponding swipe down and swipe up stitched images of the user's finger, which are output to host system 318. Host system 318 analyzes the swipe down and swipe up stitched images, and extracts minutiae from the two images. In one embodiment, host system 318 also determines a minutiae delta value from the swipe down and swipe up stitched images. Minutiae delta values are described in further detail below with reference to FIGS. 4A-4C. The extracted minutia and the associated minutiae delta value uniquely identify the user, and are stored as a set of fingerprint data 326 in memory 322.

After the enrollment phase, host system 318 can authenticate or verify whether a potential user of system 318 is an authorized user. In one form of the invention, a potential user is requested by host system 318 to swipe his finger in a downward direction on swipe surface 108A of swipe sensor 100, and then to swipe his finger upward on swipe surface 108A. Fingerprint controller 316 generates corresponding swipe down and swipe up stitched images of the potential user's finger, which are output to host system 318. Host system 318 analyzes the swipe down and swipe up stitched images, and extracts minutiae from the two images. In one embodiment, host system 318 also determines a minutiae delta value from the swipe down and swipe up stitched images. In one form of the invention, under the control of authentication application 324, processor 320 compares the extracted minutiae and the minutiae delta value for the potential user with the previously stored fingerprint data 326, and determines whether the fingerprint data 326 includes a matching set of data. In one form of the invention, the potential user is prevented from operating host system 318 until the user's fingerprint has been properly authenticated by authentication application 324.

It will be understood by a person of ordinary skill in the art that functions performed by image sensing and processing device 114 and host system 318 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

Figures 4A, 4B, 4C:
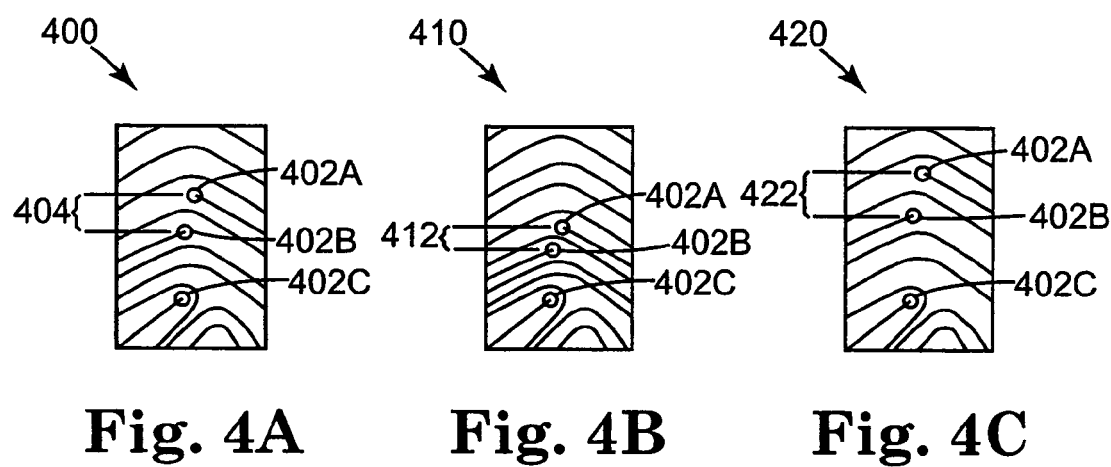
FIG. 4A is a simplified diagram illustrating an example fingerprint image captured by an optical area sensor.
FIG. 4B is a simplified diagram illustrating a stitched fingerprint image generated from images captured during a swipe-down motion according to one embodiment of the present invention.
FIG. 4C is a simplified diagram illustrating a stitched fingerprint image generated from images captured during a swipe-up motion according to one embodiment of the present invention.

FIGS. 4A-4C are diagrams illustrating simplified representations of fingerprint images for the same finger. FIG. 4A is a simplified diagram illustrating an example fingerprint image 400 captured by an optical area sensor. FIG. 4B is a simplified diagram illustrating a stitched fingerprint image 410 generated from images captured during a swipe-down motion according to one embodiment of the present invention. FIG. 4C is a simplified diagram illustrating a stitched fingerprint image 420 generated from images captured during a swipe-up motion according to one embodiment of the present invention. Images 400, 410, and 420 each include the same minutiae 402A-402C (collectively referred to as minutiae 402). However, the distances or spacing between the minutiae and the pitch of the ridges are not the same for images 400, 410, and 420, for reasons that are explained in further detail below. The distances between minutiae 402A and 402B in images 400, 410, and 420, are represented by the reference numbers 404, 412, and 422, respectively.

The distance 412 between minutiae 402A and 402B in the swipe-down image 410 (FIG. 4B) is the smallest of the three distances 404, 412, and 422. Similarly, the spacing between ridges (i.e., the ridge pitch) for the swipe-down image 410 is the smallest of the three images 400, 410, and 420. The distance 422 between the same two minutiae 402A and 402B in the swipe-up image 420 (FIG. 4C) is the largest of the three distances 404, 412, and 422. And the spacing between ridges for the swipe-up image 420 is the largest of the three images 400, 410, and 420.

More generally, for the swipe-down image 410, the ridge pitch is narrower and the minutiae 402 are closer together than for images 400 and 420. For the swipe-up image 420, the ridge pitch is wider and the minutiae 402 are stretched farther apart than for images 400 and 410. The difference in ridge pitch and minutiae spacing between the images 400, 410, and 420, is a result of the deformation of the finger when it is swiped up or swiped down on sensor 100. A real human's finger, unlike a photocopy of a finger, is soft. So the finger deforms while swiping down and swiping up on the sensor 100. The deformation during swiping down of the finger is different than the deformation during swiping up of the finger. Correspondingly, the stitched image of a swipe down movement (e.g., image 410) is different than the stitched image of a swipe up movement (e.g., image 420). More specifically, during a swipe-down movement (i.e., toward the user's wrist), the fingertip 104 is pushed against the tip of the fingernail, thereby narrowing the ridge pitch and moving the minutiae 402 close together. During a swipe-up movement (i.e., away from the user's wrist), the fingertip 104 is pushed by the user away from the wrist and pulled by friction toward the wrist, thereby widening the ridge pitch and moving the minutia 402 farther apart.

Assuming that distance 412 is 2 millimeters (mm) and that distance 422 is 4 mm, the difference between the two distances 412 and 422 would be 2 mm. This difference is referred to as the minutiae delta. If distance 412 is 2 mm, and distance 422 is 4 mm, the distance 404 for image 400 would be somewhere between 2 mm and 4 mm (e.g., about 3 mm).

In contrast to a real human finger, a photocopy does not deform like an actual human finger when it is swiped up or swiped down on a swipe sensor, such as sensor 100. The stitched images for swipe up and swipe down movements of the photocopy will appear the same. Thus, for a photocopy, the minutiae delta will be zero. In one embodiment, the effects of finger deformation are taken into account by host system 318 to distinguish between a real human finger and a fake finger. In one form of the invention, host system 318 distinguishes between a real human finger and a fake finger based on minutiae delta values, as described in further detail below with reference to FIGS. 5 and 6.

Figure 5:
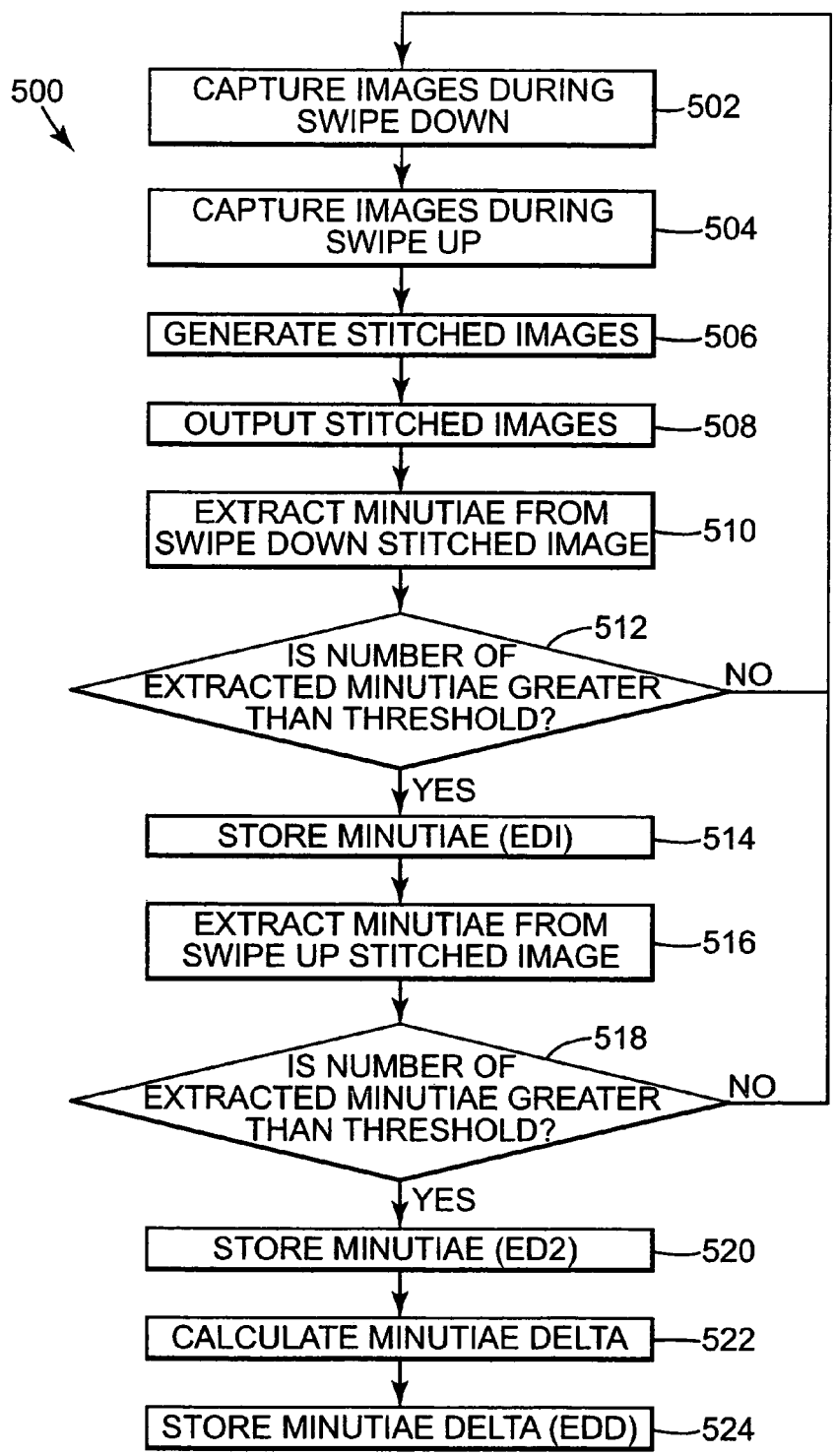
FIG. 5 is a flow diagram illustrating a fingerprint enrollment method according to one embodiment of the present invention.

FIG. 5 is a flow diagram illustrating a fingerprint enrollment method 500 performed by sensor 100 and host system 318 according to one embodiment of the present invention. In step 502, a user swipes his finger 102 down on prism 108, and a first set of images of the finger 102 are captured by image sensor 116. In step 504, a user swipes his finger 102 up on prism 108, and a second set of images of the finger 102 are captured by image sensor 116. In step 506, the first set of images is stitched together by device 114 to form a swipe down stitched image, and the second set of images are stitched together to form a swipe up stitched image. In step 508, the two stitched images are output from device 114 to host system 318.

In step 510, host system 318 extracts minutiae from the swipe down stitched image. In step 512, host system 318 determines if the number of minutiae extracted from the swipe down stitched image is greater than a predetermined threshold number. If the number of minutiae extracted from the swipe down stitched image is not greater than the predetermined threshold number, the method returns to step 502 to repeat the image capture process. If the number of minutiae extracted from the swipe down stitched image is greater than the predetermined threshold number, the method moves on to step 514. In step 514, the extracted minutiae (represented herein as ED1) for the swipe down stitched image are stored in memory 322 of host system 318.

In step 516, host system 318 extracts minutiae from the swipe up stitched image. In step 518, host system 318 determines if the number of minutiae extracted from the swipe up stitched image is greater than a predetermined threshold number. If the number of minutiae extracted from the swipe up stitched image is not greater than the predetermined threshold number, the method returns to step 502 to repeat the image capture process. If the number of minutiae extracted from the swipe up stitched image is greater than the predetermined threshold number, the method moves on to step 520. In step 520, the extracted minutiae (represented herein as ED2) for the swipe up stitched image are stored in memory 322 of host system 318.

In step 522, host system 318 calculates a minutiae delta value for the swipe down and swipe up stitched images. In one embodiment, the minutiae delta value is calculated by comparing the swipe down and swipe up stitched images, and determining the difference in the distance between two minutiae in the swipe down stitched image and the distance between the same two minutiae in the swipe up stitched image. In another embodiment, other techniques may be used to represent the difference between the swipe down and swipe up images caused by deformation of the finger. In step 524, the calculated minutiae delta value (represented herein as EDD) is stored in memory 322 of host system 318.

Figure 6:
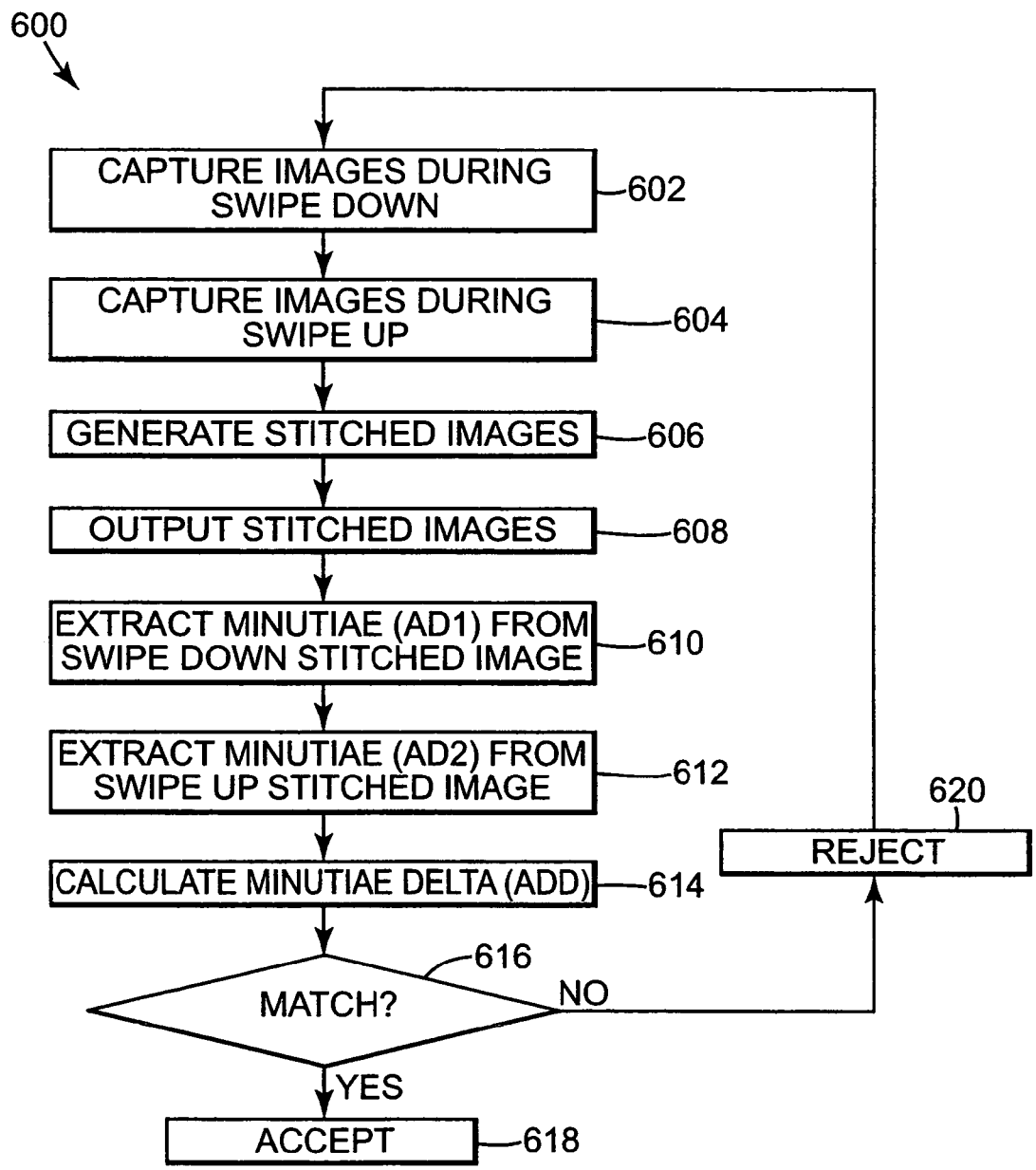
FIG. 6 is a flow diagram illustrating a fingerprint authentication method according to one embodiment of the present invention.

After the enrollment process, host system 318 can authenticate or verify new fingerprints based on the fingerprint data 326 obtained during enrollment. FIG. 6 is a flow diagram illustrating a fingerprint authentication method 600 performed by sensor 100 and host system 318 according to one embodiment of the present invention. In step 602, a user swipes his finger 102 down on prism 108, and a first set of images of the finger 102 are captured by image sensor 116. In step 604, a user swipes his finger 102 up on prism 108, and a second set of images of the finger 102 are captured by image sensor 116. In step 606, the first set of images is stitched together by device 114 to form a swipe down stitched image, and the second set of images are stitched together to form a swipe up stitched image. In step 608, the two stitched images are output from device 114 to host system 318.

In step 610, host system 318 extracts minutiae (represented herein as AD1) from the swipe down stitched image. In step 612, host system 318 extracts minutiae (represented herein as AD2) from the swipe up stitched image. In step 614, host system 318 calculates a minutiae delta value (represented herein as ADD) for the swipe down and swipe up stitched images. In one embodiment, the minutiae delta value is calculated by comparing the swipe down and swipe up stitched images, and determining the difference in the distance between two minutiae in the swipe down stitched image and the distance between the same two minutiae in the swipe up stitched image.

In step 616, host system 318 determines if the data AD1, AD2, and ADD, matches fingerprint data 326 obtained during the enrollment process. In one embodiment, if host system 318 determines that AD1 matches ED1, AD2 matches ED2, and ADD matches EDD, host system 318 accepts the person as an authorized user, as indicated in step 618. If AD1 does not match ED1, or AD2 does not match ED2, or ADD does not match EDD, host system 318 rejects the person as not being an authorized user, as indicated in step 620, and the method returns to step 602.

One form of the present invention provides a system with an optical fingerprint swipe sensor with better recognition accuracy than prior fingerprint sensors. In one form of the invention, enhanced recognition accuracy is provided by performing two scans (e.g., a swipe down scan and a swipe up scan), which allows additional minutiae to be extracted. In one embodiment, the system distinguishes between a real human finger and a fake finger.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of recognizing a fingerprint, the method comprising:
providing a fingerprint sensor;
capturing a first set of images of a finger when the finger is swiped in a first direction on the fingerprint sensor;
stitching the first set of images together to form a first stitched image;
capturing a second set of images of the finger when the finger is swiped in a second direction on the fingerprint sensor;
stitching the second set of images together to form a second stitched image;
wherein the finger is deformed when swiped on the fingerprint sensor and wherein the deformation of the finger when swiped in the first direction is different from the deformation of the finger when swiped in the second direction;
comparing minutiae in the first and the second stitched images to stored fingerprint data;
determining whether the finger is recognizable based on the comparison; and
generating movement information with the fingerprint sensor, the movement information indicative of movement of the finger on the fingerprint sensor;
wherein the first and the second stitched images are formed based on the movement information.

2. The method of claim 1, and further comprising:
comparing the distance between features in the first stitched image with the distance between features in the second stitched image.

3. The method of claim 2, and further comprising:
determining whether the finger is a real human finger based on the comparison of the distance between features, and the stored fingerprint data.

4. The method of claim 1, and further comprising:
calculating a delta value representing a difference between the distance between features in the first stitched image and the distance between features in the second stitched image.

5. The method of claim 4, and further comprising:
comparing the delta value to the stored fingerprint data to determine whether the finger is a real human finger.

6. The method of claim 5, and further comprising:
calculating a first value representing the distance between a first minutia and a second minutia in the first stitched image;
calculating a second value representing the distance between the first minutia and the second minutia in the second stitched image; and
wherein the delta value represents the difference between the first value and the second value.

7. The method of claim 1 wherein:
the swipe in one of the first and second directions causes narrowing of ridge pitch and moving of minutiae closer together; and
the swipe in the other of the first and second directions causes widening of ridge pitch and moving of minutiae farther apart.

8. A method of recognizing a fingerprint, the method comprising:
providing a fingerprint sensor;
capturing a first set of images of a finger when the finger is swiped in a first direction on the fingerprint sensor;
stitching the first set of images together to form a first stitched image;
capturing a second set of images of the finger when the finger is swiped in a second direction on the fingerprint sensor;
stitching the second set of images together to form a second stitched image;
comparing minutiae in the first and the second stitched images to stored fingerprint data;
determining whether the finger is recognizable based on the comparison; and
calculating a delta value representing a difference between the distance between features in the first stitched image and the distance between features in the second stitched image.

9. The method of claim 8, and further comprising:
comparing the delta value to the stored fingerprint data to determine whether the finger is a real human finger.

10. The method of claim 9, and further comprising:
calculating a first value representing the distance between a first minutia and a second minutia in the first stitched image;
calculating a second value representing the distance between the first minutia and the second minutia in the second stitched image; and
wherein the delta value represents the difference between the first value and the second value.

* * * * *